United States Patent [19]

Hayata et al.

[11] 4,264,175
[45] Apr. 28, 1981

[54] FOCUSING DEVICE IN CAMERA EQUIPPED WITH BOTH STANDARD AND TELEPHOTO LENSES

[75] Inventors: Toshinori Hayata, Osaka; Kunio Tsuji, Nagaokakyo; Akitoshi Morioka, Settsu, all of Japan

[73] Assignee: West Electric Company, Ltd., Osaka, Japan

[21] Appl. No.: 168,266

[22] Filed: Jul. 10, 1980

[51] Int. Cl.³ .......................... G03B 3/02; G03B 17/00
[52] U.S. Cl. ..................................... 354/197; 354/289
[58] Field of Search .................... 354/195, 197, 289

[56] References Cited

U.S. PATENT DOCUMENTS

| | | | |
|---|---|---|---|
| 3,903,537 | 9/1975 | Ettischer | 354/197 |
| 3,913,113 | 10/1975 | Yamashita | 354/195 |
| 4,119,983 | 10/1978 | Tanaka | 354/197 |
| 4,204,760 | 5/1980 | Kobayashi | 354/197 |

*Primary Examiner*—Donald A. Griffin
*Attorney, Agent, or Firm*—Burgess, Ryan and Wayne

[57] ABSTRACT

In a camera equipped with both a standard lens and a telephoto lens which may be arbitrarily selected for exposures by manipulating a first control knob, a focusing device is provided which selects the focusing ranges or depths of field of the telephoto lens by a second control knob only in the case of the photography with the telephoto lens.

2 Claims, 7 Drawing Figures

FOCUSING DEVICE IN CAMERA EQUIPPED WITH BOTH STANDARD AND TELEPHOTO LENSES

BACKGROUND OF THE INVENTION

The present invention relates to a focusing device for a camera equipped with both a standard lens and a telephoto lens which can be arbitrarily selected for exposure framing.

The so-called pocket cameras are very popular mainly because of their simple operations or manipulations, that is, it is easy to load a casette of film or the like and no focusing is needed. In addition to the pocket cameras with only a standard lens, those equipped with a standard lens and a telephoto lens or a wide-angle lens as well have been put into the market recently. With such a camera, a user can arbitrarily select a standard lens or a telephoto or wide-angle lens depending upon a desired frame.

It is a well known fact that in general the shorter the focal length of a camera lens, the deeper the depth of field becomes.

A standard lens built into a pocket camera is such that it can sharply focus a subject at a relatively closer distance to a subject at infinity; that is, the standard lens has a deep depth of field. A wide-angle lens has, of course, a focal length shorter than that of a standard lens. Therefore, with a pocket camera equipped both with a standard lens and a wide-angle lens, the selection and use of either of the standard or wide-angle lens will not cause any adverse effects on focusing. However, a pocket camera equipped with both a standard lens and a telephoto lens gives rise to some problems. Since the telephoto lens has a long focal length, its depth of field is shallow. Therefore, in the case of the photography or exposure with the telephoto lens, a subject must be sharply focused. Otherwise, it would be out of focus.

SUMMARY OF THE INVENTION

The present invention was made to overcome the above and other problems encountered in the prior art pocket cameras equipped with both a standard lens and a telephoto lens.

One of the objects of the present invention is, therefore, to provide a focusing device for a camera equipped with both a standard lens and a telephoto lens, in which the telephoto lens is axially displaced with respect to a film depending upon a distance from the camera to a subject by a control or shifting means which can be manipulated only in the case of the photography with the telephoto lens so that the subject can be sharply focused.

Another object of the present invention is to provide a focusing device of the type described above which is very simple both in construction and operation.

DESCRIPTION OF THE PREFERRED EMBODIMENT

Figure 1:
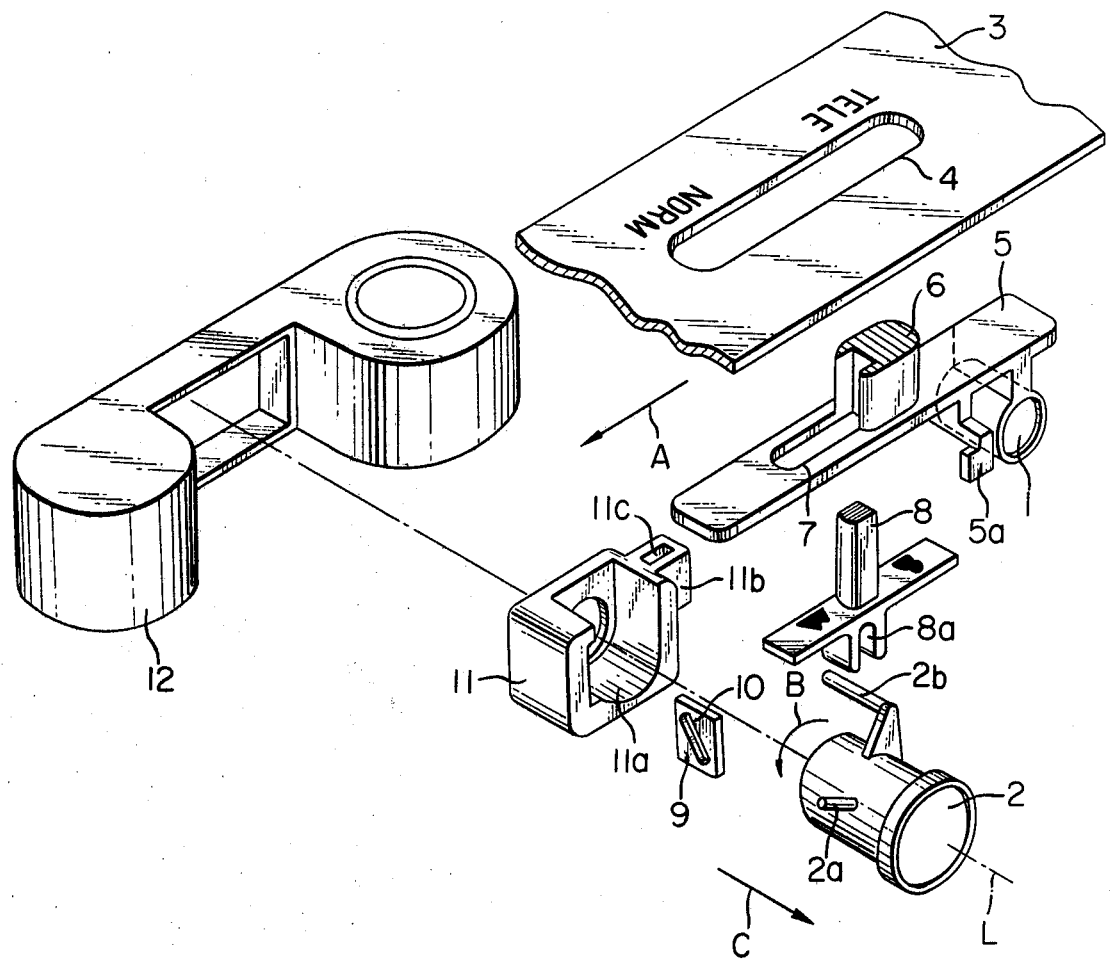
FIG. 1 is an exploded perspective view of a focusing device in accordance with the present invention.

Referring to FIG. 1, reference numeral 1 denotes a standard lens; 2, a telephoto lens; and 3, part of the camera body. The camera body 3 is formed with a first slot 4 in which is slidably received a first operating knob or a photographing mode selection knob 6 extended from a control lever 5 which brings either of the standard or telephoto lens to an operative or photographing position.

Numeral 7 is a second slot formed through the control lever 5 and partly through the first operating knob or the mode selection knob 6; 8, a second operating knob or a telephoto lens focusing knob slidably received in the second and first slots 7 and 4 for rotating the telephoto lens 2; 9, a control member or a cam plate formed with a cam slot 10 which slidably receives a control rod or a cam follower 2a extended radially from the telephoto lens 2 so that the rotational motion can be translated into the linear motion when the telephoto lens 2 is rotated by the second operating knob or focusing knob 8; 11, a block for supporting the telephoto lens 2 and the control member or cam plate 9; and 12, a film used for exposures.

The second operating knob or the focusing knob 8 has a forked engaging member or a forked or bifurcated projection or lug 8a for engagement with a projection or a pin 2b extended in parallel with the axis of the telephoto lens 2. Therefore, the sliding motion of the second operating knob or the focusing knob 8 is transmitted to the telephoto lens 2 through the engaging member or forked lug 8a and the projection or pin 2b, whereby the telephoto lens 2 is rotated.

The supporting block 11 has a recess in which are received the telephoto lens 2 and the control member or cam plate 9 and a projection formed with an engaging hole 11c into which is fitted an engaging projection 5a extended from the control or mode selection lever 5. As a result, the supporting block 11 is caused to slide in unison with the control or mode selection lever 5.

As shown in FIG. 1, the standard lens 1 is rigidly mounted on the control or mode selection lever 5 so that when the latter slides in either direction, either of the standard lens 1 or the telephoto lens 2 is brought to the photographing position. Alternatively, the standard lens 1 can be mounted just like a pendulum in such a way that the swinging motion can be controlled at one end.

Marked over the camera body 3, which is formed with the first slot 4, are marks for indicating whether the standard lens 1 or the telephoto lens 2 is in the photographing position, either of the marks being selected or indicated by the position of the first operating or mode selection knob 6. Marked also over the flat plate portion or flat projections extended at right angles from the second operating or focusing knob 8 are marks for indicating the state of the telephoto lens 2 depending upon the position of the second operating or focusing knob 8; that is, for indicating the focusing range or the depth of field of the telephoto lens 2.

The focusing mechanism in accordance with the present invention is designed and constructed as described above and its mode of operation will be described below.

First let us consider that the component members shown in FIG. 1 have been assembled. The telephoto lens 2 is located on the optical axis L for photography or exposure. Therefore, it goes without saying that the camera is in the telephoto exposure position.

Figure 2A:
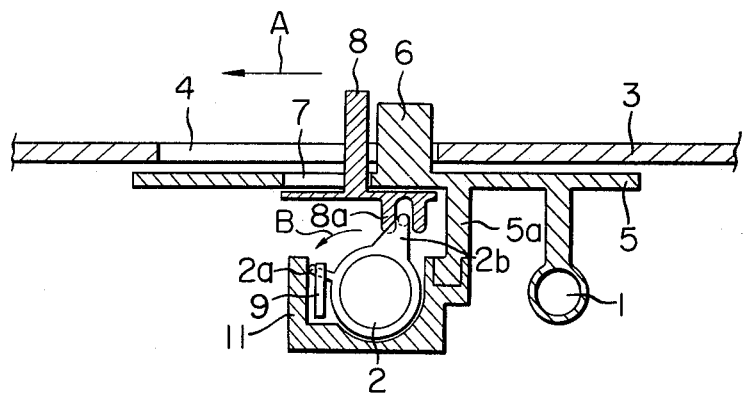
FIG. 2A is a front section thereof with a telephoto lens in the photographing position.
Figure 2B:
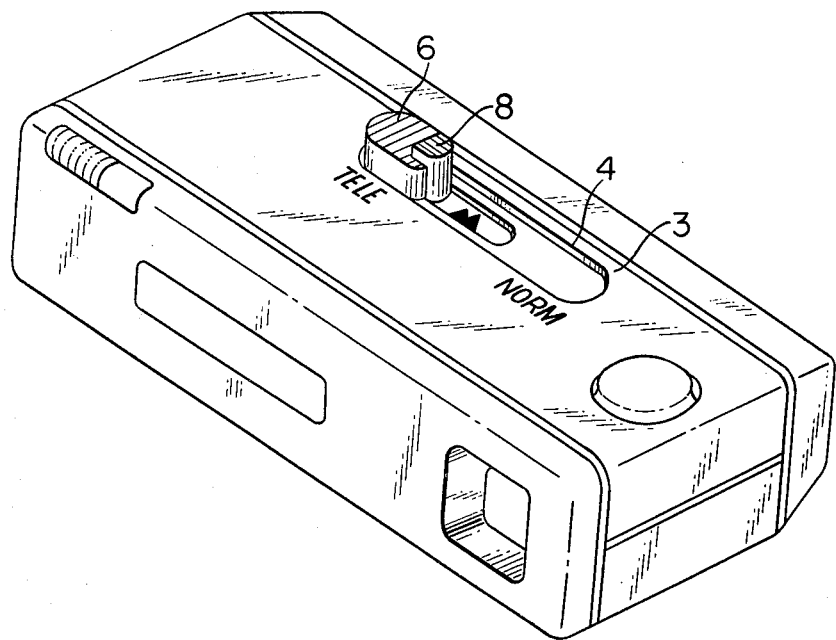
FIG. 2B is a perspective view of a camera incorporating the focusing device shown in FIG. 1 or 2A.

FIG. 2A is a front view in section of the assembled camera while FIG. 2B is a perspective view thereof. As is clearly seen from FIG. 1 and FIGS. 2A and 2B, both the first and second operating knobs 6 and 8 are displaced to the extreme right position in the first and second slots 4 and 7 (See FIG. 2A). The second operating or focusing knob 8 is received in the recess of the first operating or mode selection knob 6 and is extended through the first slot 4 outwardly. FIG. 2A also shows clearly the relationships between the engaging member or forked lug 8a of the second operating or focusing knob 8 and the projection or pin 2b of the telephoto lens 2 and between the projection or cam follower 2b of the telephoto lens 2 and the control member 9 or the cam slot 10 thereof.

The mark such as "TELE" for indicating the telephoto mode is marked on the camera body 3 at the position at which are located the first and second operating knobs 6 and 8. An operator can also see the mark such as "▲▲" on the flat plate portion or flat extension of the second operating or focusing knob 8 through the first and second slots 4 and 7, this mark indicating the state of the telephoto lens 2 or the focusing range thereof. In other words, the engagement of the second operating or focusing knob 8 with the recess in the first or mode selection knob 6 sets the camera in one of the two telephotographing modes.

Next let us consider what happens when the second operating or focusing knob 8 is displaced in the direction indicated by the arrow A from the position indicated in FIGS. 1 and 2A and 2B.

As described above, the second operating or focusing knob 8 is extended outward through the first and second slots 4 and 7 so that it can be easily operated with hands or fingers from the exterior. In addition, as is clear from the exploded perspective view shown in FIG. 1, there exists no obstacle in the direction A from the position described above. As a result, the sliding movement can be attained easily in the direction A with hands or fingers.

When the second operating or focusing knob 8 is caused to slide in the direction A from the position shown in FIGS. 1 and 2A, the sliding motion is transmitted to the telephoto lens 2 through the joint between the engaging portion or forked lug 8a of the second operating or focusing knob 8 and the projection or pin 2b of the telephoto lens 2 so that the latter is caused to rotate in the direction indicated by the arrow B. Then, because of the relationship as shown in FIG. 1 between the rod or cam follower 2a and the cam slot 10 of the control member or cam plate 9, the telephoto lens 2 is caused to displace itself along the optical axis L in the direction C. In short, the shift in the direction A of the second operating or focusing knob 8 causes the telephoto lens 2 to rotate in the direction B while shifting in the direction C at the same time.

Figure 3A:
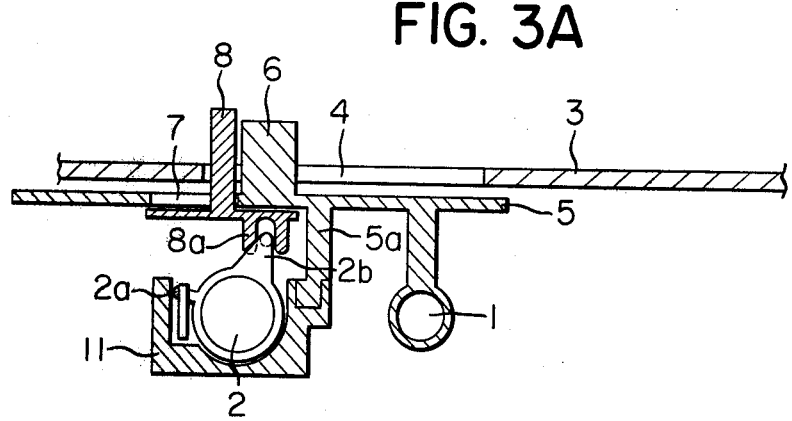
FIG. 3A is a front section of the focusing device in the mode for photographing through the telephoto lens a subject at a relatively close distance.
Figure 3B:
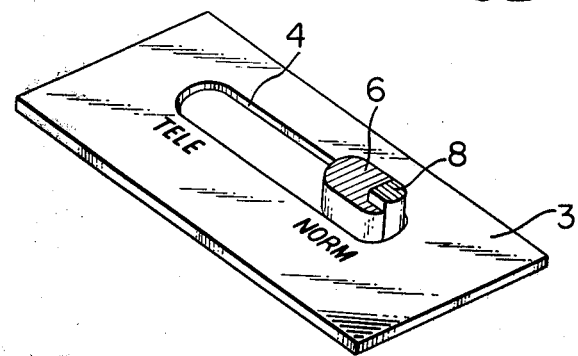
FIG. 3B is a fragmentary perspective view thereof, showing the positions of a standard or telescope mode selection knob and a focusing knob.

The above described conditions are shown in a front section in FIG. 3A and a fragmentary perspective view in FIG. 3B.

As is clear from the front section in FIG. 3A, when the second operating or focusing knob 8 is displaced in the direction A from the position shown in FIG. 3A, the telephoto lens 2 is caused to rotate and shift as described elsewhere. As a result, the relationships between the engaging portion or forked lug 8a and the projection or pin 2b and between the cam slot 10 of the control member or cam plate 9 and the rod or cam follower pin 2a change from those shown in FIG. 2A.

Obviously, the second operating or focusing knob 8 is moved from the extreme right position in the second slot 7 shown in FIGS. 2A and 3A to the extreme left position. As a result, the mark "▲▲", which was visually observed as shown in FIG. 2B, is shifted beneath the control lever 5 so that the mark "▲▲" cannot be seen.

Now let us consider the movement of the telephoto lens 2 itself resulting from the above described changes or operations. The telephoto lens 2 is caused to rotate in the direction B while moving in the direction C from the position shown in FIG. 1. As a result, as compared with the conditions shown in FIGS. 1 and 2, the position of the telephoto lens 2 is more displaced from the film 12; that is, to the position at which the telephoto lens 2 can sharply focus a subject at a relatively close distance.

In summary, when the mark "▲▲" becomes invisible by the operation of the second operating or focusing knob 8 as shown in FIG. 3B, the mark "▲▲" becomes visible through the first and second slots 4 and 7.

When the first operating or mode selection knob 6 is shifted in the direction A from the position shown in FIG. 1, 2A or 2B, the control lever 5 is also caused to slide in the direction A, because the first control or mode selection knob 6 is extended from the control lever 5.

The control lever 5 directly carries the standard lens 1 and indirectly carries the telephoto lens 2 which is mounted on the supporting block 11 which in turn is supported by the control lever 5 through the joint between the engaging projection 5a and the engaging recess 11c. As a result, when the control lever 5 is caused to displace itself toward the direction A, both the standard lens 1 and the telephoto lens 2 are caused to slide in the same direction. The telephoto lens 2 is withdrawn from the optical axis L while the standard lens 1 is moved toward it. The sliding movement is continued until the axis of the standard lens 1 coincides exactly with the optical axis for photography L.

As described elsewhere, the control lever 5 has not only the first operating or mode selection lever 6 but also the second slot 7 in which is slidably received the second operating or focusing knob 8. As a result, the sliding movement of the first operating or mode selection knob 6 causes the movement of the control lever 5 which in turn causes the sliding movement of the second or focusing knob 8. So far the sliding movements of the standard lens 1 and the telephoto lens 2, i.e., those of the supporting block 11 and the second operating or focusing knob 8 have been described separately, but because the second operating or focusing knob 8 has such relationships with the telephoto lens 2 that either of two focusing positions can be selected as described in detail above, it goes without saying that the movements of various members resulting from the sliding movement of the control lever 5 are ingeniously correlated.

Figure 4A:
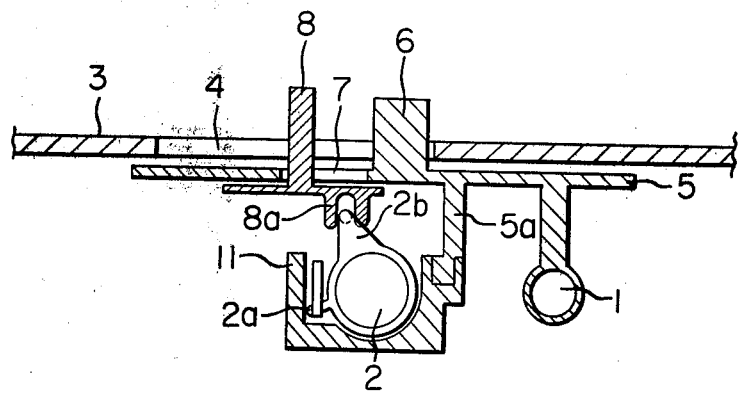
FIG. 4A is a front section of the focusing device in the mode for photographing through the standard lens.
Figure 4B:
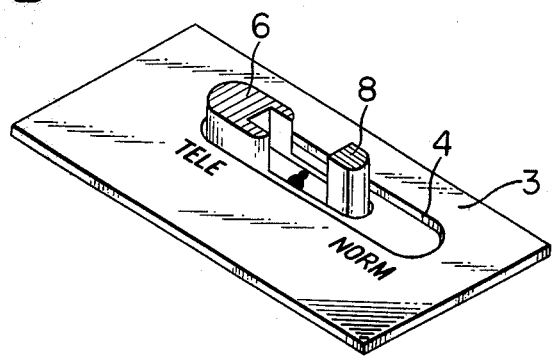
FIG. 4B is a fragmentary perspective view thereof, showing the positions of the mode selection knob and the focusing knob in the standard photography mode.

FIGS. 4A and 4B show, in front section and fragmentary perspective view, the position of the first operating or mode selection knob 6 when shifted in the direction A.

As shown in FIG. 4A, the telephoto lens 2 which is shown in coincidence with the optical axis L in FIG. 1, 2A or 3A is shifted to the left while the standard lens 1 is brought to the photographing position, at which the optical axis of the standard lens 1 coincides exactly with the optical axis L for photography or exposure.

Since the first operating or mode selection knob 6 is shifted in the direction A, the second operating or focusing knob 8 is shifted to the extreme left position in the first slot 4 as shown in FIG. 1 or 2A so that the manipulation of the second control or focusing knob 8 for selecting either of the two focusing positions becomes impossible. More specifically, with the second control or focusing knob 8 in this position, the telephoto lens 2 is not in coincidence with the optical axis L for exposure. As a result, even when the focusing of the telephoto lens 2 could be controlled, it could not attain any meaningful effect. The construction described above can attain the simplification in operation or manipulation, which is one of the major features of the focusing mechanism in accordance with the present invention.

As shown in FIG. 4B, the second control or focusing knob 8 is at the extreme right position in the first slot 4 and is locked in the recess of the first operating or mode selection knob 8 and the second slot is located below the wall of the camera body 3 so that the marks on the flat extensions of the second operating or focusing knob 8 can not be seen. The first operating or mode selection knob 6 and the second operating or focusing knob 8 are located at the extreme right position marked with "NORM", whereby an operator or user can notice that the telephoto photographing mode has been switched to the photographing mode with the standard lens 1.

In summary, according to the present invention, in a camera capable of photographing with either of a standard lens or a telephoto lens, especially in the photographing mode with the telephoto lens, the position of the latter with respect to the film can be varied, whereby subjects at various distances can be sharply focused. Thus, the effects of the depth of field on photographing or focusing can be corrected and the use of a lens with a higher magnification without involving any wasteful operations becomes possible. In addition, according to the present invention, two control knobs are slidably received in a slot formed through the wall of a camera body so that the selections between the standard lens and the telephoto lens and between various focusing positions only in the case of the photography with the telephoto lens can be much simplified.

What is claimed is:

1. A focusing device characterized by the provision of
    (a) a supporting block for supporting a telephoto lens in such a way that the latter can be rotated while being moved,
    (b) a control lever which supports said supporting block and carries a standard lens,
    (c) a first slot formed through a wall of a camera body for slidably receiving a first operating knob extended from said control lever,
    (d) a second control knob disposed for slidable movement, thereby causing said telephoto lens to rotate through an engaging means on said telephoto lens,
    (e) a control member rigidly attached to said supporting block for converting the rotation of said telephoto lens by said second control knob into a linear translation,
    (f) a second slot formed through said control lever and partly into said first control knob,
    (g) said first control knob being extended through said first slot out of said camera body, and
    (h) said second control knob being extended through said first and second slots out of said camera body, whereby when said second slot is located within said first slot, said telephoto lens is located at the position in which the optical axis of said telephoto lens coincides with the optical axis for exposure while the slidable movement in said second slot of said second control knob is permitted only in the case of the photography or exposure with said telephoto lens.

2. A focusing device as set forth in claim 1 wherein in response to the positions of said second control knob the marks indicating the focusing ranges of said telephoto lens change.

* * * * *

UNITED STATES PATENT AND TRADEMARK OFFICE
CERTIFICATE OF CORRECTION

PATENT NO. : 4,264,175
DATED : April 28, 1981
INVENTOR(S) : Toshinori Hayata et al It is certified that error appears in the above—identified patent and that said Letters Patent is hereby corrected as shown below:

On the cover sheet Insert:

-- (30) Foreign Application Priority Data

July 18, 1979    Japan    54-98245 --.

Signed and Sealed this

Twenty-first Day of July 1981

[SEAL]

Attest:

GERALD J. MOSSINGHOFF

Attesting Officer    Commissioner of Patents and Trademarks